United States Patent
Hadav et al.

(10) Patent No.: US 11,403,001 B2
(45) Date of Patent: Aug. 2, 2022

(54) SYSTEM AND METHOD FOR STORAGE SYSTEM NODE FENCING

(71) Applicant: EMC IP Holding Company, LLC, Hopkinton, MA (US)

(72) Inventors: Aric Hadav, Tel Aviv (IL); Boris Glimcher, Bnei Brak (IL); Amitai Alkalay, Kadima (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 161 days.

(21) Appl. No.: 16/863,127

(22) Filed: Apr. 30, 2020

(65) Prior Publication Data
US 2021/0342075 A1  Nov. 4, 2021

(51) Int. Cl.
G06F 11/20  (2006.01)
G06F 3/06  (2006.01)
G06F 11/07  (2006.01)

(52) U.S. Cl.
CPC .......... *G06F 3/0619* (2013.01); *G06F 3/0653* (2013.01); *G06F 3/0683* (2013.01); *G06F 11/079* (2013.01); *G06F 11/0727* (2013.01); *G06F 11/202* (2013.01); *G06F 11/2023* (2013.01)

(58) Field of Classification Search
CPC ............. G06F 11/0727; G06F 11/2023; G06F 11/2046; G06F 11/2043; G06F 11/202; G06F 11/0709; G06F 11/07; G06F 3/0683; G06F 3/0653
See application file for complete search history.

(56) References Cited

U.S. PATENT DOCUMENTS

| | | | |
|---|---|---|---|
| 7,590,737 B1 * | 9/2009 | Chen | G06F 11/004 709/223 |
| 2005/0283641 A1 * | 12/2005 | Clark | G06F 11/2028 714/4.11 |
| 2007/0022138 A1 * | 1/2007 | Erasani | H04L 69/40 |
| 2007/0174517 A1 * | 7/2007 | Robillard | G06F 3/0658 710/62 |
| 2014/0250320 A1 * | 9/2014 | Nyuunoya | G06F 11/2092 714/4.11 |
| 2015/0074448 A1 * | 3/2015 | Ageishi | G06F 13/24 714/4.11 |
| 2016/0323148 A1 * | 11/2016 | Butcher | H04L 41/04 |
| 2021/0271428 A1 * | 9/2021 | Su | G06F 11/3034 |

* cited by examiner

*Primary Examiner* — Yolanda L Wilson
(74) *Attorney, Agent, or Firm* — Brian J. Colandreo; Mark H. Whittenberger; Holland & Knight LLP (57) ABSTRACT

A method, computer program product, and computing system for receiving, at a first baseboard management controller (BMC) of a first node, a fence request from a central processing unit (CPU) of the first node. The first BMC of the first node may communicate with a second BMC of a second node, wherein the first node and the second node are communicatively coupled to a plurality of storage drives. The first BMC and the second BMC may determine which node of the first node and the second node to fence from the plurality of storage drives. One of the first node and the second node may be fenced, via one of the first BMC and the second BMC, from the plurality of storage drives, thus defining a fenced node.

17 Claims, 5 Drawing Sheets

SYSTEM AND METHOD FOR STORAGE SYSTEM NODE FENCING

BACKGROUND

Storing and safeguarding electronic content may be beneficial in modern business and elsewhere. Accordingly, various methodologies may be employed to protect and distribute such electronic content. For example, in high availability storage systems, there may be two or more central processing unit (CPU) nodes that access the same data area using some kind of synchronization flow between the CPU nodes. The synchronization flow can be done via network, shared drives scratch-pad, or any other path. In the event the synchronization flow mechanism is broken between the CPUs, each CPU node may believe it is the "sole survivor" (also referred to as split brain scenario). In such a scenario, input/output (IO) operations from each CPU node may corrupt shared data, as each sole survivor accesses and changes the data without notifying the other CPU.

Upon synchronization flow failure, each sole surviving CPU will try to make sure that the other CPUs are "fenced" from accessing the shared data until the problem is resolved. If the CPUs are alive and there's only an issue of communication between the two, then a condition of a fencing race between the CPUs may evolve and cause double fencing scenario, where each CPU may fence the other CPUs at the same time causing complete storage system data unavailability.

SUMMARY OF DISCLOSURE

In one example implementation, a computer-implemented method executed on a computing device may include, but is not limited to, receiving, at a first baseboard management controller (BMC) of a first node, a fence request from a central processing unit (CPU) of the first node. The first BMC of the first node may communicate with a second BMC of a second node, wherein the first node and the second node are communicatively coupled to a plurality of storage drives. The first BMC and the second BMC may determine which node of the first node and the second node to fence from the plurality of storage drives. One of the first node and the second node may be fenced, via one of the first BMC and the second BMC, from the plurality of storage drives, thus defining a fenced node.

One or more of the following example features may be included. A synchronization flow failure between the first node and the second node may be detected. Determining, via the first BMC and the second BMC, which node of the first node and the second node to fence from the plurality of storage drives may include transmitting, via one of the first BMC and the second BMC, the fence request to the fenced node. The first node, the second node, and the plurality of storage drives may be positioned within a disk processor enclosure. Fencing, via one of the first BMC and the second BMC, one of the first node and the second node from the plurality of storage drives may include asserting a reset signal on a plurality of storage drive ports of the plurality of storage drives communicatively coupled to the fenced node. The first node and the second node are positioned within a processor enclosure and the plurality of storage drives may be positioned within a disk array enclosure separate from and communicatively coupled to the processor enclosure. Fencing, via one of the first BMC and the second BMC, one of the first node and the second node from the plurality of storage drives may include one or more of asserting, via one of the first BMC and the second BMC, a reset signal on a network controller configured to communicatively couple the fenced node to the plurality of storage drives; and requesting, via one of the first BMC and the second BMC, the network controller to disable communications between the fenced node and the plurality of storage drives.

In another example implementation, a computer program product resides on a computer readable medium that has a plurality of instructions stored on it. When executed by a processor, the instructions cause the processor to perform operations that may include, but are not limited to, receiving, at a first baseboard management controller (BMC) of a first node, a fence request from a central processing unit (CPU) of the first node. The first BMC of the first node may communicate with a second BMC of a second node, wherein the first node and the second node are communicatively coupled to a plurality of storage drives. The first BMC and the second BMC may determine which node of the first node and the second node to fence from the plurality of storage drives. One of the first node and the second node may be fenced, via one of the first BMC and the second BMC, from the plurality of storage drives, thus defining a fenced node.

One or more of the following example features may be included. A synchronization flow failure between the first node and the second node may be detected. Determining, via the first BMC and the second BMC, which node of the first node and the second node to fence from the plurality of storage drives may include transmitting, via one of the first BMC and the second BMC, the fence request to the fenced node. The first node, the second node, and the plurality of storage drives may be positioned within a disk processor enclosure. Fencing, via one of the first BMC and the second BMC, one of the first node and the second node from the plurality of storage drives may include asserting a reset signal on a plurality of storage drive ports of the plurality of storage drives communicatively coupled to the fenced node. The first node and the second node are positioned within s enclosure and the plurality of storage drives may be positioned within a disk array enclosure separate from and communicatively coupled to the processor enclosure. Fencing, via one of the first BMC and the second BMC, one of the first node and the second node from the plurality of storage drives may include one or more of asserting, via one of the first BMC and the second BMC, a reset signal on a network controller configured to communicatively couple the fenced node to the plurality of storage drives; and requesting, via one of the first BMC and the second BMC, the network controller to disable communications between the fenced node and the plurality of storage drives.

In another example implementation, a computing system includes at least one processor and at least one memory architecture coupled with the at least one processor, wherein the at least one processor is configured to receive, at a first baseboard management controller (BMC) of a first node, a fence request from a central processing unit (CPU) of the first node. The at least one processor may be further configured to communicate, via the first BMC of the first node, with a second BMC of a second node, wherein the first node and the second node are communicatively coupled to a plurality of storage drives. The at least one processor may be further configured to determine, via the first BMC and the second BMC, which node of the first node and the second node to fence from the plurality of storage drives. The at least one processor may be further configured to fence, via one of the first BMC and the second BMC, one of the first node and the second node from the plurality of storage drives, thus defining a fenced node.

One or more of the following example features may be included. The at least one processor may be further configured to detect a synchronization flow failure between the first node and the second node. Determining, via the first BMC and the second BMC, which node of the first node and the second node to fence from the plurality of storage drives may include transmitting, via one of the first BMC and the second BMC, the fence request to the fenced node. The first node, the second node, and the plurality of storage drives may be positioned within a disk processor enclosure. Fencing, via one of the first BMC and the second BMC, one of the first node and the second node from the plurality of storage drives may include asserting a reset signal on a plurality of storage drive ports of the plurality of storage drives communicatively coupled to the fenced node. The first node and the second node are positioned within a processor enclosure and the plurality of storage drives may be positioned within a disk array enclosure separate from and communicatively coupled to the processor enclosure. Fencing, via one of the first BMC and the second BMC, one of the first node and the second node from the plurality of storage drives may include one or more of asserting, via one of the first BMC and the second BMC, a reset signal on a network controller configured to communicatively couple the fenced node to the plurality of storage drives; and requesting, via one of the first BMC and the second BMC, the network controller to disable communications between the fenced node and the plurality of storage drives.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
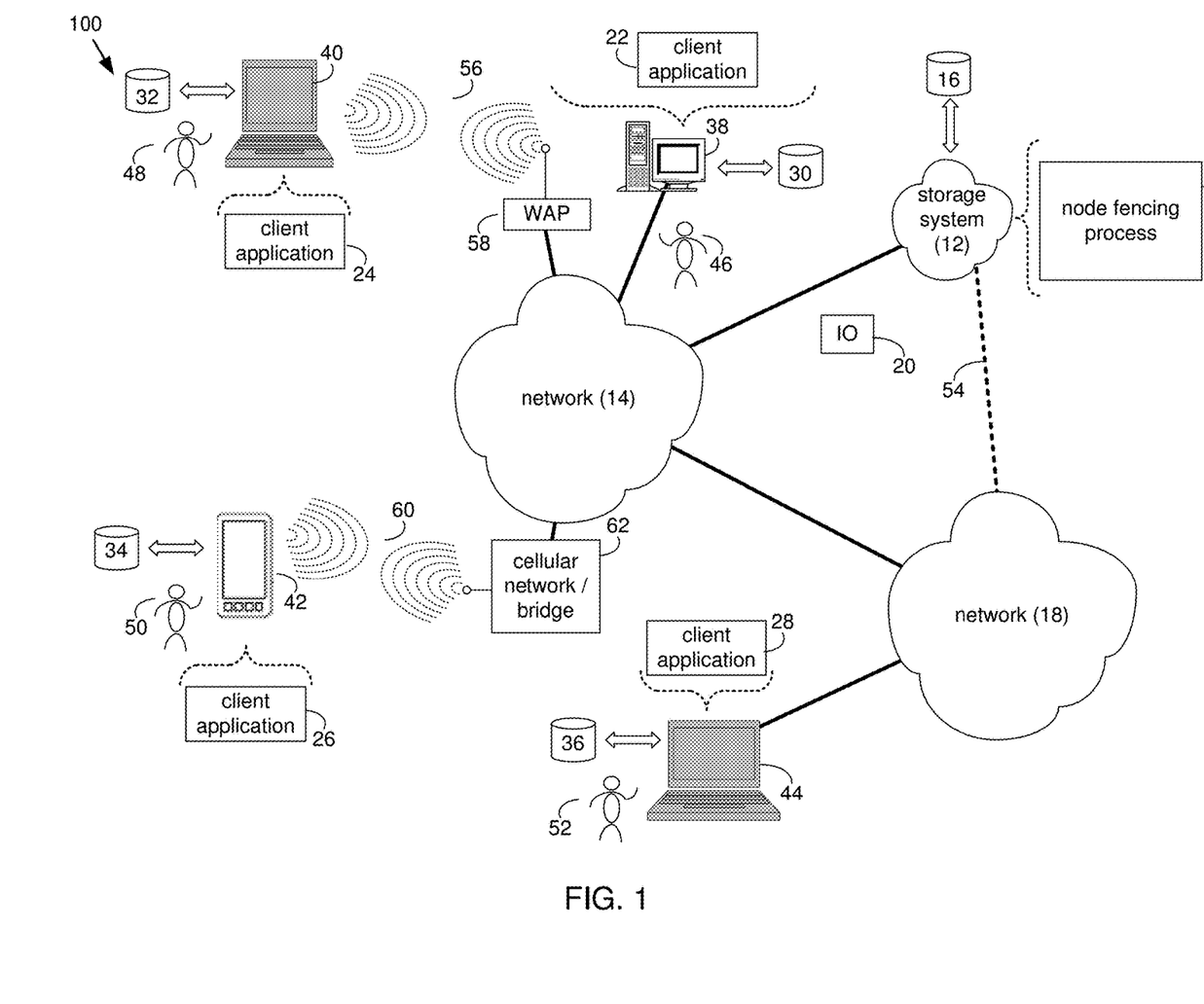
FIG. 1 is an example diagrammatic view of a storage system and a node fencing process coupled to a distributed computing network according to one or more example implementations of the disclosure.

Referring to FIG. 1, there is shown node fencing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of node fencing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RANI); a read-only memory (ROM); and all forms of flash memory storage devices. Additionally/alternatively, some portions of the instruction sets and subroutines of node fencing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a node fencing process, such as node fencing process 10 of FIG. 1, may include but is not limited to, receiving, at a first baseboard management controller (BMC) of a first node, a fence request from a central processing unit (CPU) of the first node. The first BMC of the first node may communicate with a second BMC of a second node, wherein the first node and the second node are communicatively coupled to a plurality of storage drives. The first BMC and the second BMC may determine which node of the first node and the second node to fence from the plurality of storage drives. One of the first node and the second node may be fenced, via one of the first BMC and the second BMC, from the plurality of storage drives, thus defining a fenced node.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
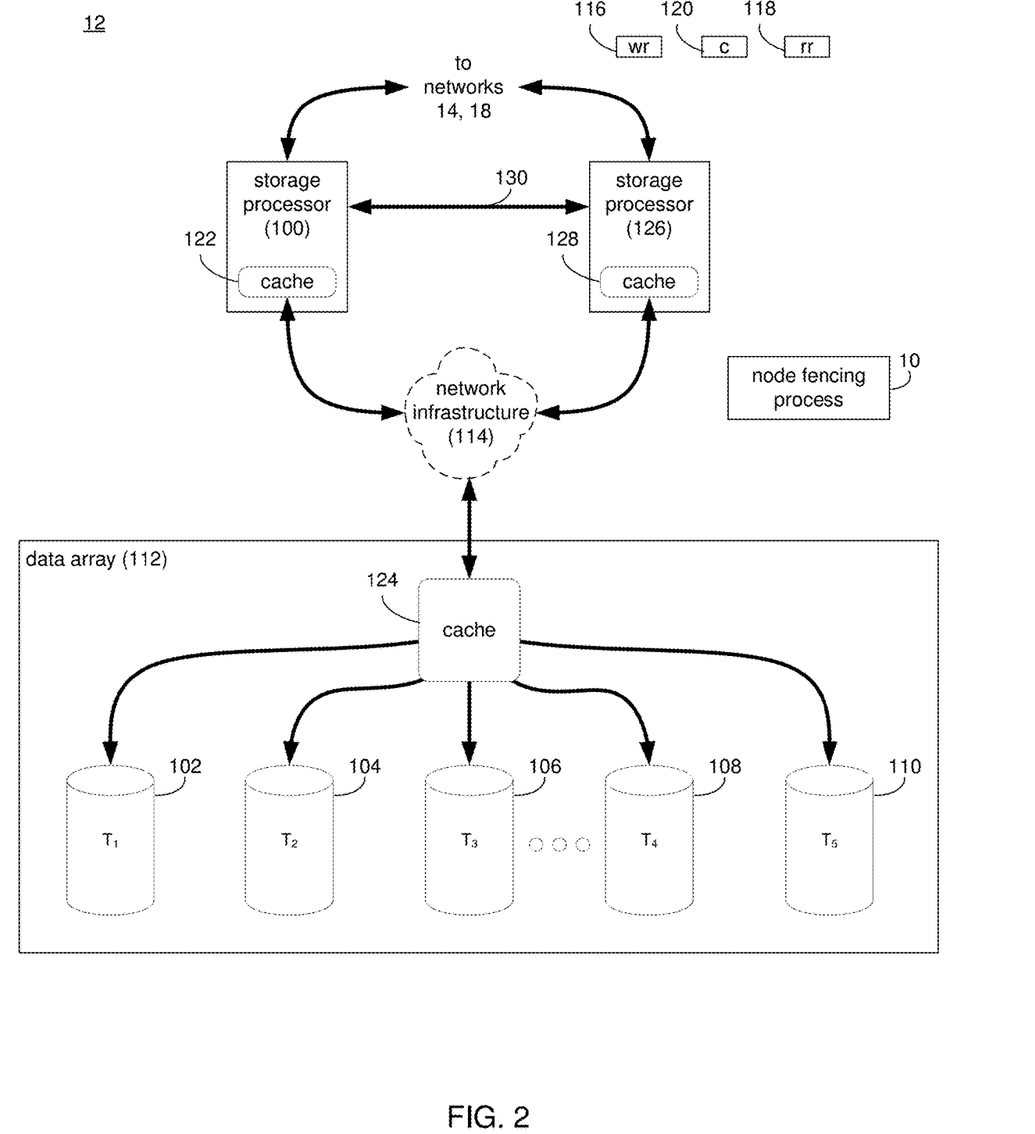
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of node fencing process 10. The instruction sets and subroutines of node fencing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of node fencing process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of node fencing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130). In some implementations, one of the storage processors may fail which may cause a significant amount of desynchronization between the storage processors.

Figure 3:
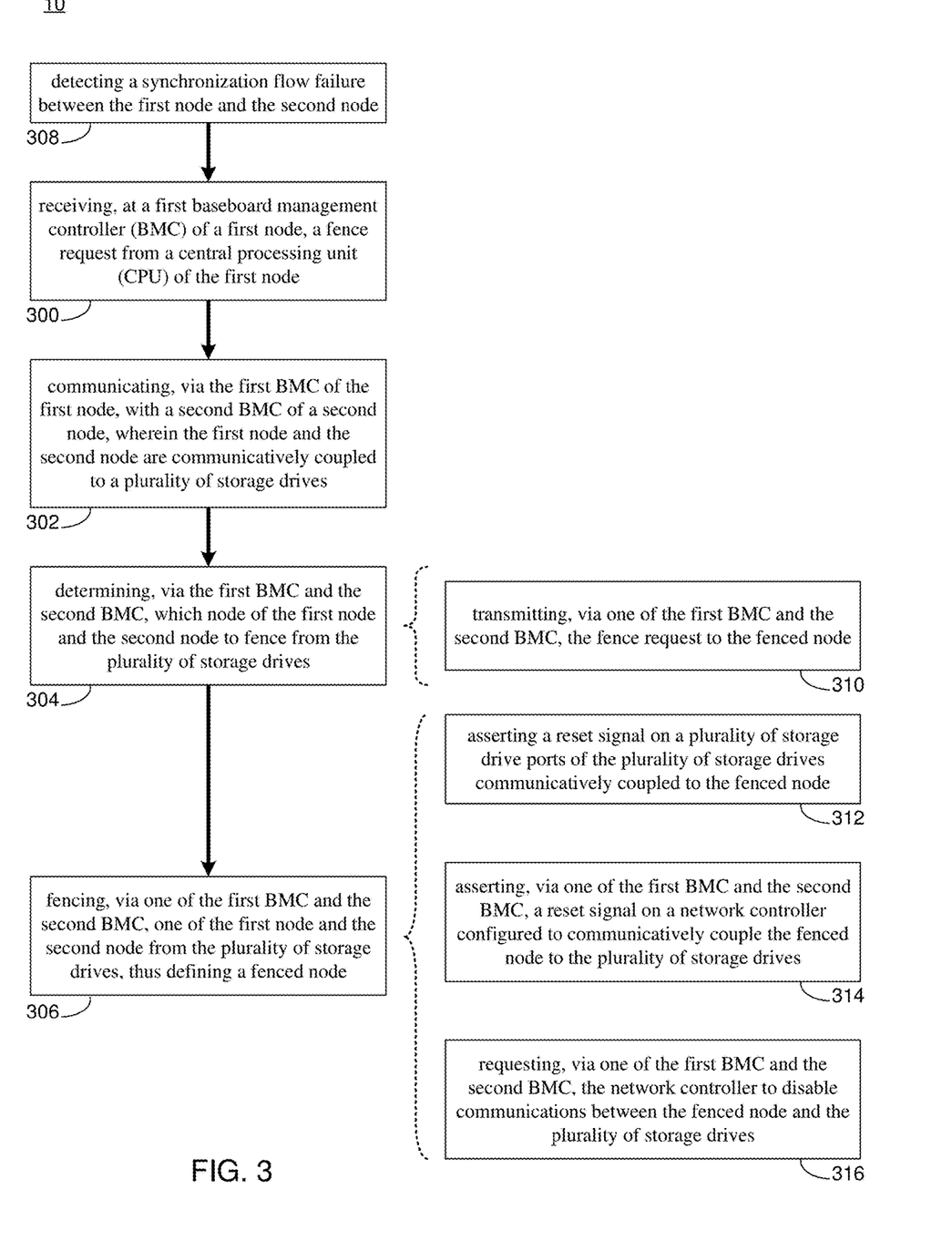
FIG. 3 is an example flowchart of node fencing process according to one or more example implementations of the disclosure.
Figure 4:
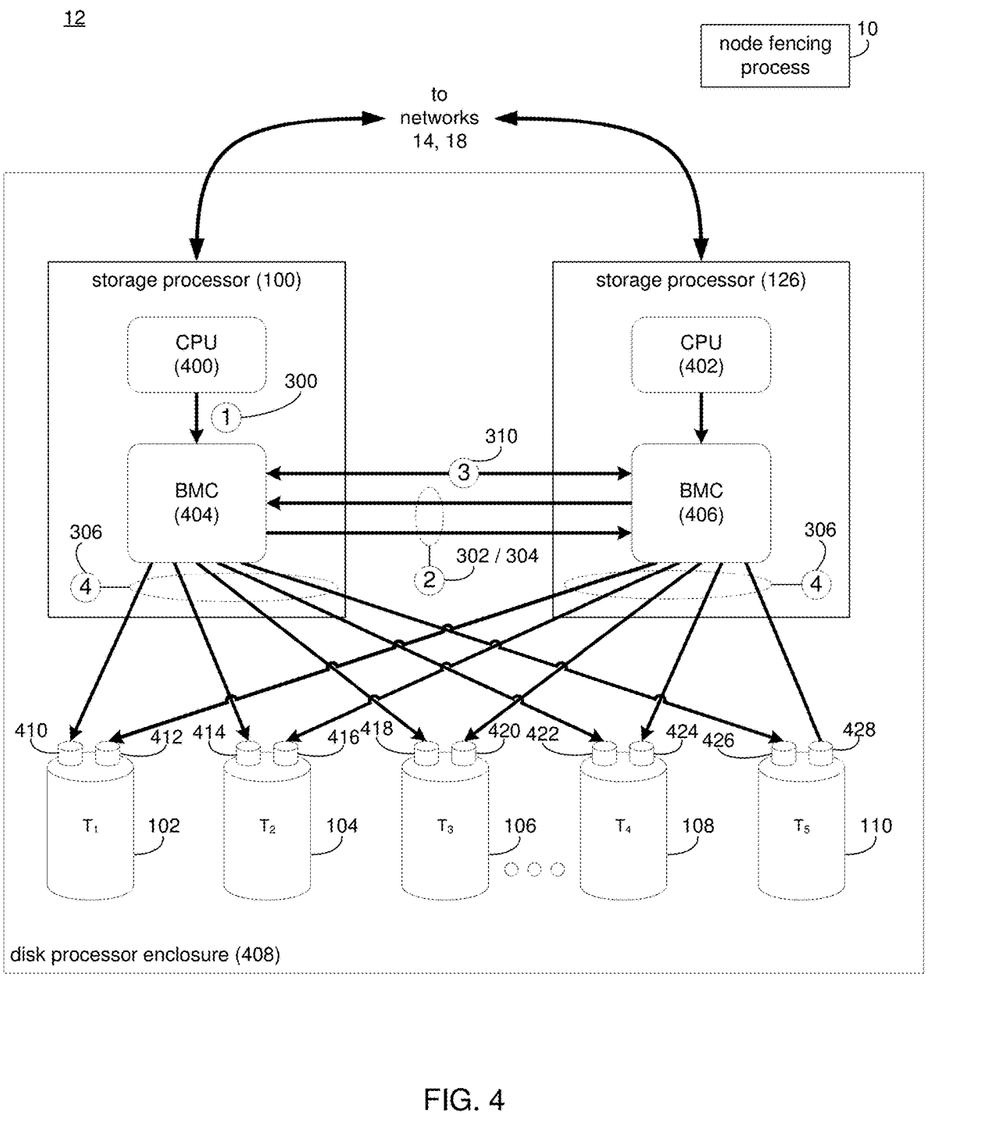
FIGS. 4-5 are example diagrammatic views of various allocations of storage systems according to one or more example implementations of the disclosure.
Figure 5:
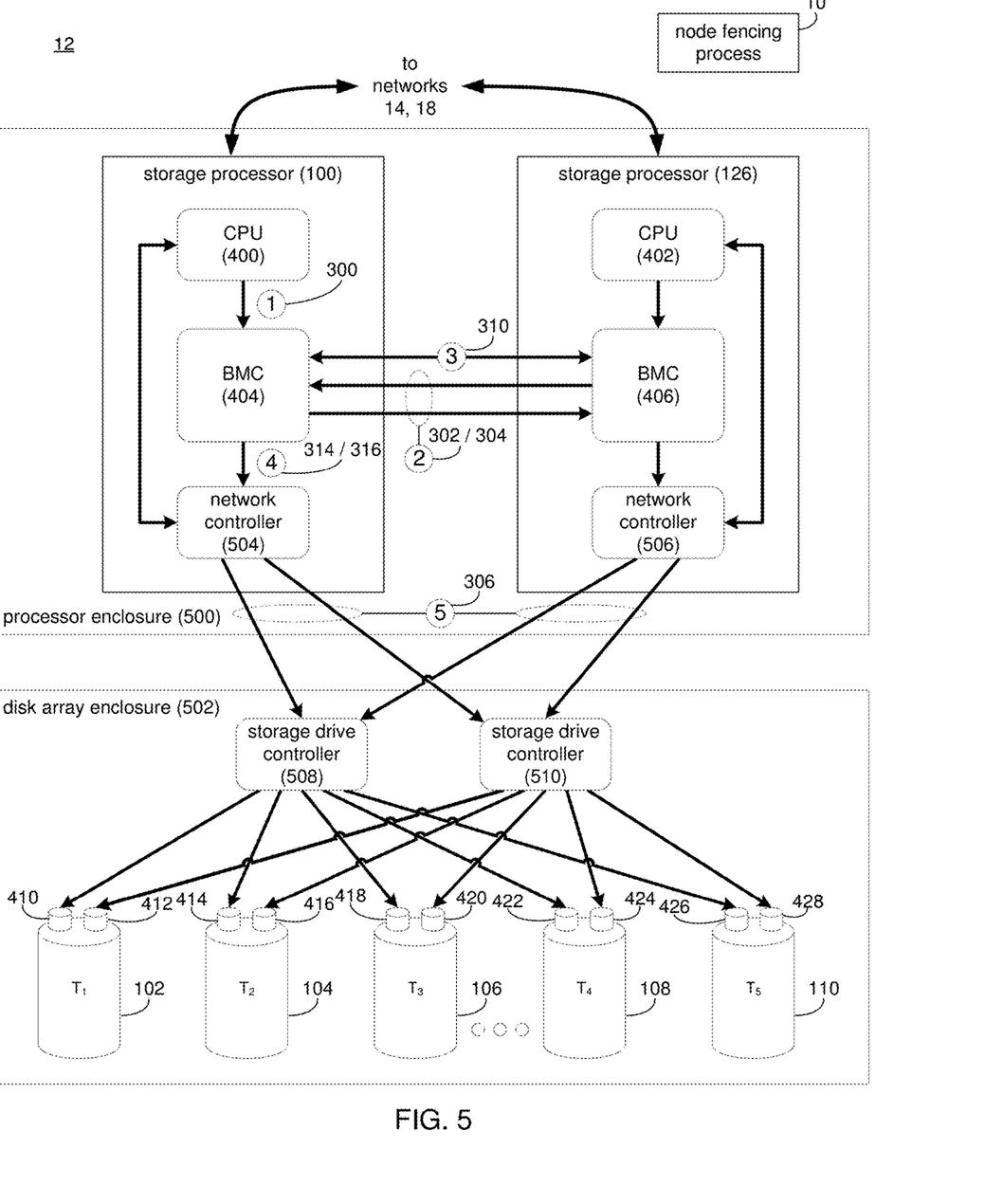

The Node Fencing Process:

Referring also to the examples of FIGS. 3-5 and in some implementations, node fencing process 10 may receive 300, at a first baseboard management controller (BMC) of a first node, a fence request from a central processing unit (CPU) of the first node. The first BMC of the first node may communicate 302 with a second BMC of a second node, wherein the first node and the second node are communicatively coupled to a plurality of storage drives. The first BMC and the second BMC may determine 304 which node of the first node and the second node to fence from the plurality of storage drives. One of the first node and the second node may be fenced 306, via one of the first BMC and the second BMC, from the plurality of storage drives, thus defining a fenced node.

As will be discussed in greater detail below, implementations of the present disclosure may allow for a reliable and resilient split-brain fencing mechanism with double fencing prevention for high availability storage systems. For example, in high availability storage systems, there may be two or more computing devices or nodes with central processing unit (CPU) (e.g., CPU nodes) that access the same data area using synchronization flow between the nodes. The synchronization flow can be done via network, shared drives scratch-pad, or any other path. In the event the synchronization flow mechanism between the nodes is disrupted or fails, each node may believe it is the "sole survivor" (also referred to as split-brain scenario). In a split-brain scenario, input/output (IO) operations from each node may corrupt shared data, as each node accesses and changes the data without notifying the other node. When a sole surviving node detects that the synchronization flow has failed, a fail-over mechanism may be engaged. At fail-over, the initiator node tries to communicate to the adjacent node via an alternate path and to ask the adjacent node to fence itself. When fenced, the node is expected not to write to the storage drives and will gracefully reset itself, as a means to fix the synchronization flow problem. However, if the self-reset process does not result in a restoration of the synchronization flow, the adjacent node would remain fenced. In some implementations, if such alternate communication is not available or is not working properly, then the initiator node may force a cold reset of the adjacent node.

Additionally, if the nodes are operational (e.g., each CPU is operational to perform operations on the shared storage system) but for a synchronization flow failure between the nodes, then a condition of a "fencing race" between the nodes may evolve and cause double fencing scenario, where each node may fence the other node(s) at the same time causing complete storage system data unavailability. As will be discussed in greater detail below, implementations of the present disclosure may allow for reliable out-of-band fencing control, thus preventing a possible unintended corruption of a user data; a quick fencing action and acknowledgement signal, thus adding little delay to the overall node fail-over process and reducing the risk to a time out event on the host storage services; double fencing prevention; persistent fencing awareness even when a node restarts; and enabling graceful fencing by allowing a fenced node to complete its reboot activities in a safe manner.

In some implementations, node fencing process 10 may detect 308 a synchronization flow failure between the first node and the second node. Referring also to the example of FIG. 4 and in some implementations, a plurality of nodes (e.g., storage processors 100, 126) may be communicatively coupled. As discussed above in the example of FIG. 2 and in some implementations, a first node (e.g., storage processor 100) and a second node (e.g., storage processor 126) may be communicatively coupled to a plurality of storage drives (e.g., storage drives 102, 104, 106, 108, 110). While FIG. 4 includes an example of e.g., two nodes and e.g., five storage drives, it will be appreciated that any number of nodes and/or storage drives may be used within the scope of the present disclosure.

As discussed above and in some implementations, the first node (e.g., storage processor 100) and the second node (e.g., storage processor 126) may be configured in a high-availability or an active/active configuration, where processing of data by one storage processor may be synchronized to the other storage processor. For example, data may be synchronized between each storage processor via a separate link or connection (e.g., a synchronization flow). The synchronization flow may generally include a network connection, a shared drive scratch-pad (e.g., where each storage processor accesses a common storage drive to obtain and provide synchronization information), or any other path. In some implementations, if and when one of the storage processors fails, the other storage processor may detect 308 a synchronization flow failure and may continue to process data within the storage system. However and as will be discussed in greater detail below, when node fencing process 10 detects 308 that the synchronization flow mechanism between the nodes has failed and each node is still functioning (i.e., the detected synchronization flow failure is not because one of the nodes has failed), each node may believe it is the "sole survivor" (also referred to as split-brain scenario). Accordingly, implementations of node fencing process 10 may alleviate the split-brain scenario by determining which node to fence and ensuring that any fencing requirement is persistent with the restarting or rebooting a fenced node.

In some implementations, node fencing process 10 may receive 300, at a first baseboard management controller (BMC) of a first node, a fence request from a central processing unit (CPU) of the first node. In some implementations, a baseboard management controller (BMC) may generally include a specialized service processor that monitors the physical state of a computing device, network server, or other hardware device using sensors and communicating with a system administrator through an independent connection per the Intelligent Platform Management Interface (IPMI). As is known in the art, IPMI defines a set of interfaces used by system administrators for out-of-band management (i.e., an independent channel configured to allow any data sent via that mechanism to be kept separate from in-band data) of computing devices and monitoring of operations on the computing devices. In some implementations, a BMC may be a specialized microcontroller embedded on the motherboard of a computing device (e.g., BMC 404 of storage processor 100 and BMC 406 of storage processor 126). As will be discussed in greater detail below, BMC 404 and BMC 406 may provide out-of-band management of fencing requests between storage processor 100 and storage processor 126.

Referring again to the example of FIG. 4 and in some implementations, in response to detecting 308 that a synchronization flow mechanism between the first node (e.g., storage processor 100) and the second node (e.g., storage processor 126) has failed, node fencing process 10 may cause a CPU (e.g., CPU 400) of a first node (e.g., storage processor 100) and/or a CPU (e.g., CPU 402) of a second node (e.g., storage processor 126) to send or transmit a fence request signal to the respective baseboard management controller of each node (e.g., BMC 404 of storage processor 100 or BMC 406 of storage processor 126). In some implementations, a fence request may generally include a request from a CPU of one node to direct another node to cease processing data for the storage system (i.e., cease processing IO operations on the storage system).

In some implementations, each CPU may be communicatively coupled to a respective BMC. For example, each CPU may be configured to communicate with its respective BMC via pulse-width modulation (PWM) signals and/or general purpose input/output (GPIO). In some implementations, a specific PWM signal or train may be used as a fence request (e.g., 500 Hz) while a separate PWM signal or train may be used as a request to end node fencing (e.g., 250 Hz). In some implementations, a specific GPIO request may be used as a fence request (e.g., "01b") while a separate specific GPIO request may be used as request to end node fencing (e.g., "10b"). While examples of communication protocols and specific examples of fencing requests and requests to end node fencing have been provided, it will be appreciated that any communication protocol and/or request signals may be used within the scope of the present disclosure.

In some implementations, a local BMC (e.g., BMC 404) may receive a fence request from a local CPU (e.g., CPU 400) and may determine whether the local BMC (e.g., BMC 404) is allowed to fence the adjacent node (e.g. storage processor 126), or if the adjacent node is already fenced. In some implementations and as will be discussed in greater detail below, if the local CPU (e.g., CPU 400) is already fenced by node fencing process 10, than the local BMC (e.g., BMC 404) may return a fence request failure to its CPU (e.g., CPU 400).

In some implementations, node fencing process 10 may communicate 302, via the first BMC of the first node, with a second BMC of a second node. In some implementations, each local BMC (e.g., BMC 404) may be communicatively coupled to each respective adjacent BMC (e.g., BMC 406). In some implementations, the communicative coupling between BMCs may be separate from any communicative coupling between other components of each node (e.g., separate from CPU-to-CPU coupling). In some implementations, each BMC may be configured to communicate via pulse-width modulation (PWM) signals and/or general purpose input/output (GPIO). In some implementations, a specific PWM signal or train may be used as a fence request (e.g., 500 Hz) while a separate PWM signal or train may be used as a request to end node fencing (e.g., 250 Hz). In some implementations, a specific GPIO request may be used as a fence request (e.g., "01b") while a separate specific GPIO request may be used as request to end node fencing (e.g., "10b"). While examples of communication protocols and specific examples of fencing requests and requests to end node fencing have been provided, it will be appreciated that any communication protocol and/or request signals may be used within the scope of the present disclosure.

In some implementations, a local BMC (e.g., BMC 404 of storage processor 100) may, in response to receiving 300 a fence request from a local CPU (e.g., CPU 400 of storage processor 100) and determining that the local CPU (e.g., CPU 400 of storage processor 100) is not already fenced by node fencing process 10, communicate 302 with an adjacent BMC (e.g., BMC 406 of storage processor 126). In some implementations, local BMC (e.g., BMC 404 of storage processor 100) may communicate 302 with each adjacent BMC (e.g., BMC 406 of storage processor 126).

In some implementations, node fencing process 10 may determine 304, via the first BMC and the second BMC, which node of the first node and the second node to fence from the plurality of storage drives. For example, suppose node fencing process 10 detects 308 a synchronization flow failure between a first node (e.g., storage processor 100) and a second node (e.g., storage processor 126) because e.g., the second node (e.g., storage processor 126) has failed. In this example, a first BMC of a first node (e.g., BMC 404 of storage processor 100) may receive 300 a fence request signal from the CPU of the first node (e.g., CPU 400 of storage processor 100) while the second BMC of a second node (e.g., BMC 406 of storage processor 126) may not receive a fence request signal from the CPU of the second node (e.g., CPU 404 of storage processor 126) because second node has failed.

In some implementations, determining 304 which node to fence may include determining a master BMC. In some implementations, a master BMC may generally be a BMC that determines which node(s) to fence. For example, a master BMC may be the only BMC that is allowed to transfer a fence request to other BMCs (e.g., non-master BMCs). Returning to the above example, because only the first BMC (e.g., BMC 404 of storage processor 100) has received 300 a fence request signal, node fencing process 10 may determine that the first BMC (e.g., BMC 404 of storage processor 100) is the master BMC. Accordingly, fencing process 10 may determine 304 that the second node (e.g., storage processor 126) is to be fenced from the plurality of storage drives (e.g., storage drives 102, 104, 106, 108, 110) because the first BMC is the master BMC that has received 300 a fence request for fencing the second node (e.g., storage processor 126). In some implementations and as will be discussed in greater detail below, determining which BMC is the master BMC may be more simple when only a single BMC receives a fence request than when multiple BMCs each receive a fence request.

In some implementations, determining 304, via the first BMC and the second BMC, which node of the first node and the second node to fence from the plurality of storage drives may include performing an arbitration process to determine which BMC of the first node and the second node is a master BMC. For example, suppose that node fencing process 10 detects 308 a synchronization flow failure, but each node is still capable of processing data for the storage system (e.g., plurality of storage drives). In this example, because the synchronization flow mechanism has failed, each node may assume that it is the sole surviving node (i.e., a split-brain situation).

Suppose the first BMC of the first node (e.g., BMC 404 of storage processor 100) receives 300 a fence request from the first CPU of the first node (e.g., CPU 400 of storage processor 100) and the second BMC of the second node (e.g., BMC 406 of storage processor 126) receives a fence request from the second CPU of the second node (e.g., CPU 402 of storage processor 126). As will be discussed in greater detail below, node fencing process 10 may, via each BMC, determine whether each of the first node and the second node are already fenced. In some implementations and in response to determining that neither node is already fenced, node fencing process 10 may communicate 302, via the first BMC of the first node, with a second BMC of a second node. In this example, as each BMC has received 300 a fence request signal, node fencing process 10 may perform an arbitration process to determine which BMC node of the first node and the second node is the master BMC node. In some implementations, node fencing process 10 may use various known voting algorithms as an arbitration process to determine which BMC of the first node (e.g., storage processor 100) and the second node (e.g., storage processor 126) is the master BMC. Accordingly, by performing an arbitration process to determine which BMC is the master BMC, node fencing process 10 may eliminate any possibility of double fencing (i.e., where each node fences each other node from processing data on the plurality of storage drives).

In some implementations, determining 304, via the first BMC and the second BMC, which node of the first node and the second node to fence from the plurality of storage drives may include transmitting 310, via one of the first BMC and the second BMC, the fence request to the fenced node. In some implementations and in response to node fencing process 10 determining which BMC is the master BMC, node fencing process 10 may transmit 310, via the master BMC, the fence request to each adjacent, non-master BMC.

In some implementations, node fencing process 10 may fence 306, via one of the first BMC and the second BMC, one of the first node and the second node from the plurality of storage drives, thus defining a fenced node. For example, in response to receiving the fence request signal from the master BMC, each non-master BMC may fence 306 the node determined 304 by node fencing process 10 to be fenced (e.g., the fenced node). As discussed above, fencing a node may generally include disabling or blocking access between the node and the plurality of storage drives. In some implementations, fencing 306 a node from the plurality of storage devices may be temporary or permanent. As will be discussed in greater detail below, how each non-master BMC (e.g., a fenced node BMC) may be based upon, at least in part, the configuration of each node and the plurality of storage devices. While several example configurations and how node fencing process 10 may fence the fenced node from the plurality of storage drives are discussed below, it will be appreciated that various storage system configurations and various methodologies for fencing the fenced node(s) may be used within the scope of the present disclosure.

In some implementations, the first node, the second node, and the plurality of storage drives may be positioned within a disk processor enclosure. Referring again to the example of FIG. 4 and in some implementations, the first node (e.g., storage processor 100), the second node (e.g., storage processor 126), and the plurality of storage drives (e.g., plurality of storage drives 102, 104, 106, 108, 110) may be positioned within a single disk processor enclosure (e.g., disk processor enclosure 408). In this example, because each of the first node (e.g., storage processor 100), the second node (e.g., storage processor 126), and the plurality of storage drives (e.g., storage drives 102, 104, 106, 108, 110) are positioned within a single disk processor enclosure (e.g., disk processor enclosure 408), the BMCs of each node (e.g., BMC 404 of storage processor 100 and BMC 406 of storage processor 126) may be communicatively coupled directly to the plurality of storage drives (e.g., storage drives 102, 104, 106, 108, 110).

In some implementations, fencing 306, via one of the first BMC and the second BMC, one of the first node and the second node from the plurality of storage drives may include asserting 312 a reset signal on a plurality of storage drive ports of the plurality of storage drives communicatively coupled to the fenced node. Suppose, for example purposes only, that node fencing process 10 determines 304 that storage processor 100 is to be fenced from accessing storage drives 102, 104, 106, 108, 110. In this example, node fencing process 10 may, via BMC 404 of storage processor 100, issue or assert 312 a continuous reset signal to all storage drives communicatively coupled to storage processor 100. As shown in the example of FIG. 4 and in some implementations, each storage drive (e.g., storage drives 102, 104, 106, 108, 110) may include a plurality of storage drive ports (e.g., storage drive ports 410, 412 for storage drive 102; storage drive ports 414, 416 for storage drive 104; storage drive ports 418, 420 for storage drive 106; storage drive ports 422, 424 for storage drive 108; storage drive ports 426, 428 for storage drive 110). While an example of e.g., two storage drive ports has been shown, it will be appreciated that each storage drive may have any number of storage drive ports.

Continuing with the above example where node fencing process 10 determines 304 that storage process 100 is the node to be fenced, node fencing process 10 may assert 312 a continuous reset signal to each storage drive port of each storage drive communicatively coupled to storage processor 100. In this manner, resetting one storage drive port will not interfere with the ability to access the data of a storage drive from any other storage drive port. Accordingly, while storage processor 100 may be fenced 306 by node fencing process 10 (e.g., via BMC 404) asserting 312 a continuous reset signal on storage drive ports 410, 414, 418, 420, 426 of storage drives 102, 104, 106, 108, 110; storage processor 126 may continue to process data on storage drives 102, 104, 106, 108, 110 via storage drive ports 412, 416, 420, 424, 428.

In some implementations, the first node and the second node may be positioned within a processor enclosure and the plurality of storage drives may be positioned within a disk array enclosure separate from and communicatively coupled to the processor enclosure. Referring also to the example of FIG. 5 and in some implementations, the first node (e.g., storage processor 100) and the second node (e.g., storage processor 126) may be positioned within a processor enclosure (e.g., processor enclosure 500) and the plurality of storage drives (e.g., plurality of storage drives 102, 104, 106, 108, 110) may be positioned within a disk array enclosure (e.g., disk array enclosure 502) separate from and communicatively coupled to the processor enclosure. As discussed above, processor enclosure 500 may be communicatively coupled to disk array enclosure 502 via a direct coupling (e.g., PCIe for NVMe drives or SAS for SAS drives) and/or a network/fabric coupling (e.g., InfiniBand or Ethernet) for NVMe over Fabric (NVMeoF) protocol for example or any other similar protocol.

In some implementations, each node (e.g., storage processors 100, 126) may include a network controller (e.g., network controller 504 of storage processor 100 and network controller 506 of storage processor 126) communicatively coupled to the CPU of the respective node (CPU 400 of storage processor 100 and CPU 402 of storage processor 126) and the BMC of the respective node (BMC 404 of storage processor 100 and BMC 406 of storage processor 126). In some implementations, each network controller (e.g., network controller 504 of storage processor 100 and network controller 506 of storage processor 126) may be configured to communicatively couple each node to the plurality of storage drives.

In some implementations, a disk array enclosure (e.g., disk array enclosure 502) may include a plurality of storage drives (e.g., storage drives 102, 104, 106, 108, 110) and one or more storage drive controllers (e.g., storage drive controllers 508, 510). While an example of e.g., two storage drive controllers has been provided, it will be appreciated that any number of storage drive controllers may be included within a disk array enclosure within the scope of the present disclosure. In some implementations, a storage drive controller (e.g., storage drive controllers 508, 510) may be configured to communicatively couple one or more nodes (e.g., storage processors 100, 126) to a plurality of storage drives (e.g., storage drives 102, 104, 106, 108, 110). In some implementations, each storage drive controller may be configured to be coupled a storage drive port of each storage drive (e.g., storage drive ports 410, 412 for storage drive 102; storage drive ports 414, 416 for storage drive 104; storage drive ports 418, 420 for storage drive 106; storage drive ports 422, 424 for storage drive 108; storage drive ports 426, 428 for storage drive 110). In this manner, failure of a single storage drive controller may not preclude access to the contents of each storage drive.

In some implementations, fencing 306, via one of the first BMC and the second BMC, one of the first node and the second node from the plurality of storage drives may include asserting 314, via one of the first BMC and the second BMC, a reset signal on a network controller. Returning the above example where node fencing process 10 determines 304 that storage processor 100 is to be fenced, node fencing process 10 may assert 314, via BMC 404 of storage processor 100, a reset signal on network controller 504. In this manner, network controller 504 may be unable to communicate any data between CPU 400 of storage processor 100 and storage drives 102, 104, 106, 108, 110. In this manner, node fencing process 10 may fence 306 storage processor 100 from accessing storage drives 102, 104, 106, 108, 110.

In some implementations, fencing 306, via one of the first BMC and the second BMC, one of the first node and the second node from the plurality of storage drives may include requesting 316, via one of the first BMC and the second BMC, the network controller to disable communications between the fenced node and the plurality of storage drives. Returning the above example where node fencing process 10 determines 304 that storage processor 100 is to be fenced, node fencing process 10 may request 316, via BMC 404 of storage processor 100, that network controller 504 disable communications between the storage processor 100 and storage drives 102, 104, 106, 108, 110. In this manner, network controller 504 may disable any communication between CPU 400 of storage processor 100 and storage drives 102, 104, 106, 108, 110. Accordingly, node fencing process 10 may fence 306 storage processor 100 from accessing storage drives 102, 104, 106, 108, 110.

In some implementations, node fencing process 10 may, via the fenced node BMC and in response to fencing 306 the fenced node, issue a fence acknowledgement signal to the master BMC, who may transfer the fence acknowledgement signal back to the CPU of the node with the master BMC. In some implementations, the fence acknowledgement signal may allow a surviving node to know if another node was actually fenced. For example, in conventional approaches, a CPU would provide a fence request but would not be able to determine if another CPU was fenced or was just inaccessible. Accordingly, node fencing process 10 may allow a surviving node to determine when another node has been fenced, thus allowing a surviving node to determine whether an adjacent node is still operational but fenced (e.g., when the fenced node sends the fence acknowledgement signal) or whether an adjacent node is not operational (e.g., no fence acknowledgement signal is received).

In some implementations, a fence request transmitted to a BMC of a node to be fenced may be persistent. For example, if a fenced node is unavailable or is removed after a fence has been issued, a fence request signal may remain. Accordingly, once a new node is inserted, node fencing process 10 may, via the new node BMC, probe a fence request signal (e.g., from an adjacent BMC) and if a fence request signal is present, then node fencing process 10 may, via the new node BMC, boot up the new node in a fenced state.

In some implementations, a synchronization flow may be restored and/or a failed node may be restored. Accordingly, node fencing process 10 may receive, via the BMC of the fenced node, a request to end the fencing of the node. As discussed above relative to a fence request, node fencing process 10 may similarly unfence a fenced node.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    detecting a synchronization flow failure between the first node and the second node;
    receiving, at a first baseboard management controller (BMC) of a first node, a fence request from a central processing unit (CPU) of the first node in response to detecting the synchronization flow failure;
    communicating, via the first BMC of the first node, with a second BMC of a second node, wherein the first node and the second node are communicatively coupled to a plurality of storage drives;
    determining, via the first BMC and the second BMC, which node of the first node and the second node to fence from the plurality of storage drives; and
    fencing, via one of the first BMC and the second BMC, one of the first node and the second node from the plurality of storage drives, thus defining a fenced node.

2. The computer-implemented method of claim 1, wherein determining, via the first BMC and the second BMC, which node of the first node and the second node to fence from the plurality of storage drives includes transmitting, via one of the first BMC and the second BMC, the fence request to the fenced node.

3. The computer-implemented method of claim 1, wherein the first node, the second node, and the plurality of storage drives are positioned within a disk processor enclosure.

4. The computer-implemented method of claim 3, wherein fencing, via one of the first BMC and the second BMC, one of the first node and the second node from the plurality of storage drives includes asserting a reset signal on a plurality of storage drive ports of the plurality of storage drives communicatively coupled to the fenced node.

5. The computer-implemented method of claim 1, wherein the first node and the second node are positioned within a processor enclosure and the plurality of storage drives are positioned within a disk array enclosure separate from and communicatively coupled to the processor enclosure.

6. The computer-implemented method of claim 5, wherein fencing, via one of the first BMC and the second BMC, one of the first node and the second node from the plurality of storage drives includes one or more of:
   asserting, via one of the first BMC and the second BMC, a reset signal on a network controller configured to communicatively couple the fenced node to the plurality of storage drives; and
   requesting, via one of the first BMC and the second BMC, the network controller to disable communications between the fenced node and the plurality of storage drives.

7. A computer program product residing on a non-transitory computer readable medium having a plurality of instructions stored thereon which, when executed by a processor, cause the processor to perform operations comprising:
   detecting a synchronization flow failure between the first node and the second node;
   receiving, at a first baseboard management controller (BMC) of a first node, a fence request from a central processing unit (CPU) of the first node in response to detecting the synchronization flow failure;
   communicating, via the first BMC of the first node, with a second BMC of a second node, wherein the first node and the second node are communicatively coupled to a plurality of storage drives;
   determining, via the first BMC and the second BMC, which node of the first node and the second node to fence from the plurality of storage drives; and
   fencing, via one of the first BMC and the second BMC, one of the first node and the second node from the plurality of storage drives, thus defining a fenced node.

8. The computer program product of claim 7, wherein determining, via the first BMC and the second BMC, which node of the first node and the second node to fence from the plurality of storage drives includes transmitting, via one of the first BMC and the second BMC, the fence request to the fenced node.

9. The computer program product of claim 7, wherein the first node, the second node, and the plurality of storage drives are positioned within a disk processor enclosure.

10. The computer program product of claim 9, wherein fencing, via one of the first BMC and the second BMC, one of the first node and the second node from the plurality of storage drives includes asserting a reset signal on a plurality of storage drive ports of the plurality of storage drives communicatively coupled to the fenced node.

11. The computer program product of claim 7, wherein the first node and the second node are positioned within a processor enclosure and the plurality of storage drives are positioned within a disk array enclosure separate from and communicatively coupled to the processor enclosure.

12. The computer program product of claim 11, wherein fencing, via one of the first BMC and the second BMC, one of the first node and the second node from the plurality of storage drives includes one or more of:
   asserting, via one of the first BMC and the second BMC, a reset signal on a network controller configured to communicatively couple the fenced node to the plurality of storage drives; and
   requesting, via one of the first BMC and the second BMC, the network controller to disable communications between the fenced node and the plurality of storage drives.

13. A computing system comprising:
   a memory; and
   a processor configured to receive, at a first baseboard management controller (BMC) of a first node, a fence request from a central processing unit (CPU) of the first node, wherein the processor is further configured to communicate, via the first BMC of the first node, with a second BMC of a second node, wherein the first node and the second node are communicatively coupled to a plurality of storage drives and are positioned within a processor enclosure while the plurality of storage drives are positioned within a disk array enclosure separate from and communicatively coupled to the processor enclosure, wherein the processor is further configured to determine, via the first BMC and the second BMC, which node of the first node and the second node to fence from the plurality of storage drives, and wherein the processor is further configured to fence, via one of the first BMC and the second BMC, one of the first node and the second node from the plurality of storage drives, thus defining a fenced node, wherein fencing one of the first node and the second node from the plurality of storage drives includes one or more of: asserting, via one of the first BMC and the second BMC, a reset signal on a network controller configured to communicatively couple the fenced node to the plurality of storage drives; and requesting, via one of the first BMC and the second BMC, the network controller to disable communications between the fenced node and the plurality of storage drives.

14. The computing system of claim 13, wherein the processor is further configured to:
   detect a synchronization flow failure between the first node and the second node.

15. The computing system of claim 13, wherein determining, via the first BMC and the second BMC, which node of the first node and the second node to fence from the plurality of storage drives includes transmitting, via one of the first BMC and the second BMC, the fence request to the fenced node.

16. The computing system of claim 13, wherein the first node, the second node, and the plurality of storage drives are positioned within a disk processor enclosure.

17. The computing system of claim 16, wherein fencing, via one of the first BMC and the second BMC, one of the first node and the second node from the plurality of storage drives includes asserting a reset signal on a plurality of storage drive ports of the plurality of storage drives communicatively coupled to the fenced node.

* * * * *